United States Patent
Adachi

Patent Number: 5,379,819
Date of Patent: Jan. 10, 1995

[54] PNEUMATIC TIRE WITH REINFORCED BEAD PORTIONS

[75] Inventor: Yukishige Adachi, Akashi, Japan

[73] Assignee: Sumitomo Rubber Industries, Ltd., Kobe, Japan

[21] Appl. No.: 797,993

[22] Filed: Nov. 26, 1991

[30] Foreign Application Priority Data

Nov. 28, 1990 [JP] Japan ................... 2-331102

[51] Int. Cl.⁶ ........................................... B60C 15/06
[52] U.S. Cl. ................................. 152/542; 152/543; 152/546; 152/552; 152/554
[58] Field of Search ............... 152/539, 541, 542, 543, 152/546, 548, 555, 565, 552, 554

[56] References Cited

U.S. PATENT DOCUMENTS

| | | | |
|---|---|---|---|
| 3,298,417 | 1/1967 | Keefe, Jr. | 152/565 |
| 3,961,657 | 6/1976 | Chrobak | 152/546 |
| 4,139,040 | 2/1979 | Samoto et al. | 152/546 |
| 4,398,584 | 8/1983 | Tansei et al. | 152/543 |
| 4,811,773 | 3/1989 | Endo et al. | 152/543 |
| 5,048,584 | 9/1991 | Nakano et al. | 152/543 |

FOREIGN PATENT DOCUMENTS

| | | | |
|---|---|---|---|
| 0801449 | 8/1936 | France | 152/555 |
| 0253205 | 11/1986 | Japan | 152/539 |
| 0063402 | 3/1989 | Japan | 152/539 |
| 0266003 | 10/1989 | Japan | 152/542 |
| 1262205 | 10/1989 | Japan | 152/542 |
| 3167011 | 7/1991 | Japan | 152/539 |
| 4011506 | 1/1992 | Japan | 152/542 |
| 1485485 | 9/1977 | United Kingdom | 152/543 |

Primary Examiner—Michael W. Ball
Assistant Examiner—Nancy T. Krawczyk

[57] ABSTRACT

The invention is directed to a pneumatic tire which comprises a carcass turned up around bead cores from axially inward to outward thereof to form two turned up portions and one main portion therebetween, the carcass turned up portions extending radially outwardly along and adjacently to the carcass main portion from the bead portion to a position not lower than a ½ height of the tire section height, an axially inner reinforcing layer disposed axially inside the carcass main portion, and an axially outer reinforcing layer disposed between the carcass main portion and each turned up portion, the inner reinforcing layer comprising one ply of high modulus cords laid at 15 to 50 degrees with respect to the tire axis and extending along the inner face of the carcass at least from a ¼ height of the tire section height to the bead portion, the outer reinforcing layer comprising two cross plies of high modulus cords laid at 30 to 60 degrees with respect to the tire circumferential direction, and the cord spacing between the adjacent plies in the outer reinforcing layer being 1 to 2 times the cord thickness.

3 Claims, 4 Drawing Sheets

PNEUMATIC TIRE WITH REINFORCED BEAD PORTIONS

The present invention relates to a pneumatic tire and a tire and rim combination, of which bead portions are reduced in weight without sacrificing tire performance, especially steering stability.

BACKGROUND OF THE INVENTION

A pneumatic tire is generally provided with a bead apex C between the carcass A and its turned up portion B in each bead portion as shown in FIG. 4. A bead apex is made of hard rubber (for example JIS A hardness of 60 to 90) to increase the bending rigidity of the bead portion and sidewall lower portion, thereby improving the steering stability. However, recent high performance ears require further improved tire performance. A tire weight reduction is one way to improve tire performance. In order to reduce the tire weight, for example, if the tread rubber volume is decreased, the road grip and wear life are decreased. If the sidewall rubber volume is decreased, reinforcement cord layers, e.g. the carcass are liable to be damaged. Therefore, it is difficult to employ those means.

It is therefore, an object of the present invention to provide a pneumatic tire, in which a tire weight reduction is achieved while the other tire performance is maintained or improved.

SUMMARY OF THE INVENTION

According to one aspect of the present invention, a pneumatic tire comprises: a pair of bead cores disposed one in each bead portion; a toroidal carcass comprising a ply of cords arranged radially at an angle of 75 to 90 degrees with respect to the tire equator, the carcass extending between the bead portions and turned up around the bead cores from axially inward to outward thereof to form two turned up portions and one main portion therebetween; and a belt layer disposed radially outside the carcass and inside the tread, each of the bead portions provided with an axially inner reinforcing layer disposed axially inside the carcass main portion and an axially outer reinforcing layer disposed between the carcass main portion and each turned up portion, the inner reinforcing layer comprising one ply of high modulus cords laid at 15 to 50 degrees with respect to the circumferential direction of the tire, the outer reinforcing layer comprising two cross plies of high modulus cords laid at 30 to 80 degrees with respect to the tire circumferential direction, the inner reinforcing layer extending along the inner face of the carcass main portion at least from a ¼ height of the tire section height to the bead portion, the radially outer edge of each carcass turned up portion being not lower than a ½ height of the tire section height, the carcass turned up portion extending radially outwardly from the bead portion adjacently to the carcass main portion, the cord spacing between the adjacent plies in the outer reinforcing layer being 1 to 2 times the cord thickness.

BRIEF DESCRIPTION OF THE DRAWINGS

An embodiment of the present invention will now be described in detail in conjunction with the accompanying drawings, in which.

DETAILED DESCRIPTION OF THE EMBODIMENTS

Figure 1:
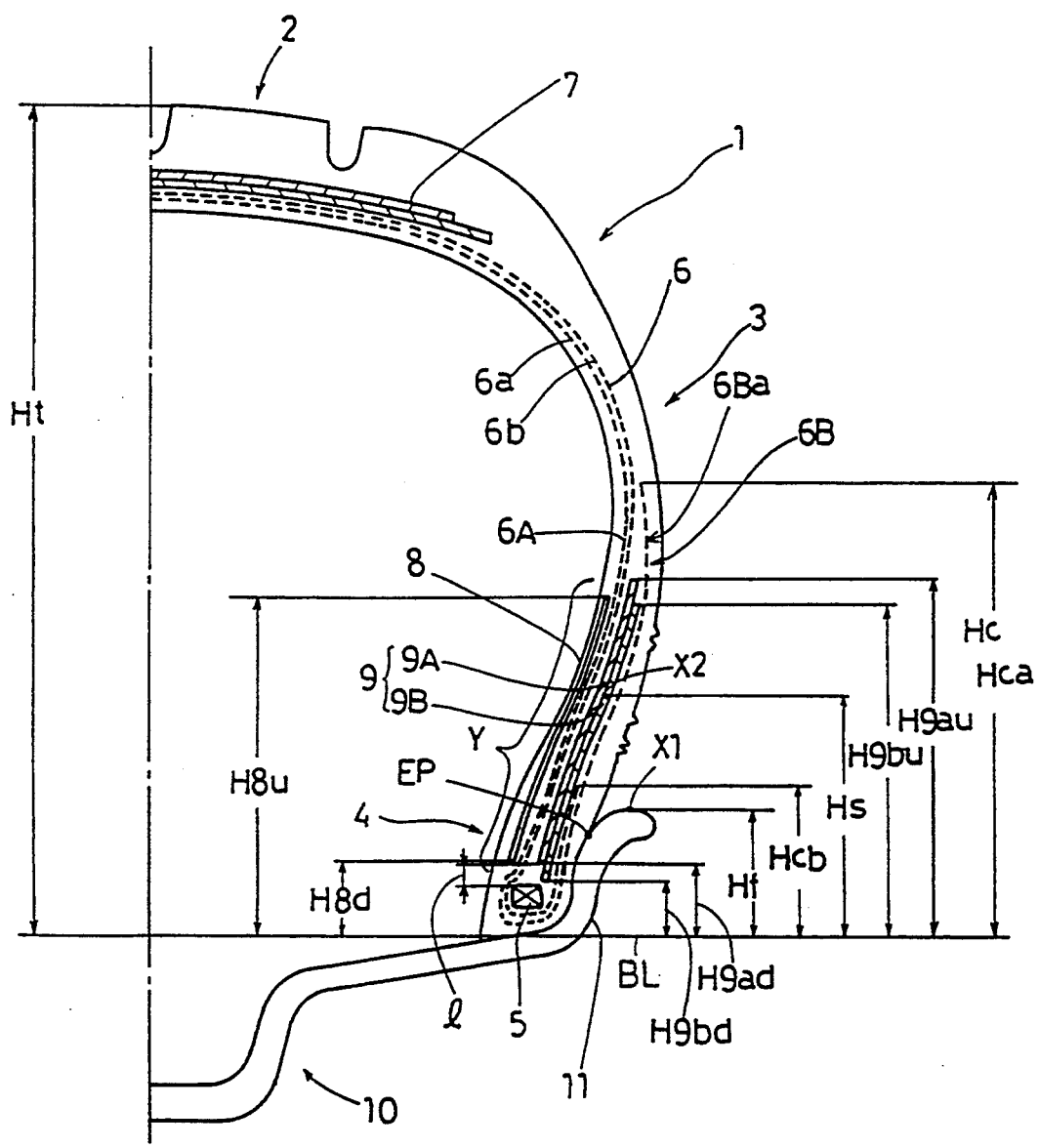
FIG. 1 is a cross sectional view of a right half of a passenger car tire according to the present invention.

In FIG. 1, the tire 1 has a tread portion 2, a pair of axially spaced bead portions 4. Further, a pair of sidewall portions 3 extending between the tread edges and the bead portions, and tire 1 is shown in its normally inflated, but unloaded state, tire 1 being mounted on a regular rim 10 with a pair of flanges 11 and inflated to its regular inner pressure.

The tire 1 comprises a pair of bead cores 5 disposed one in each bead portion 4, a carcass 6, a belt layer 7, an axially inner reinforcing layer 8, and an axially outer reinforcing layer 9.

The carcass 6 has at least one ply, in this embodiment two plies 6a and 6b of cords arranged radially at an angle of 75 to 90 degrees with respect to the tire equator so as to form a radial or so called semiradial arrangement. The carcass 6 extends between the bead portions 4 through the tread portion 2 and is sidewall portions 3 and turned up around the bead cores 5 from the axially inside to the outside thereof to form two turned up portions 6B and one main portion 6A of the carcass 6.

For the carcass cords, light weight cords are used. For example, organic fiber cords, e.g. nylon, polyester, rayon, aromatic polyamide and the like, or carbon fiber cords can be used.

The radial height Hc of the radially outer edge of the carcass turnup 6B or the height Hca of the radially outer edge of the axially outer turned up portion 6Ba of the inner carcass ply 6a is not less than ½ times the tire section height Ht, each from the bead base line BL. Here, the tire section height Ht is defined as a radial distance measured from the bead base line BL to the radially outermost point on the tread face.

The radial height Hcb of the radially outer edge of the axially inner turned up portion 6Bb of the outer carcass ply 6b from the bead base line BL is larger than a rim flange height Hf. Here, the rim flange height Hf is defined as a radial distance measured from the bead base line BL to the radially outer edge X1 of the flange 11 of the rim 10. The height Hca of the axially outer turned up portion 6Bb is larger than the height Hcb of the axially inner turned up portion 6Bb.

The belt layer 7 comprises a plurality of plies, in this embodiment two plies, of cords disposed between the carcass 6 and a tread rubber 2.

The cords in each belt ply are laid parallel with each other but crosswise to those of the next belt ply.

For the belt layer 7, light weight and high modulus cords, e.g. aromatic polyamide cords, are preferably used. In such a case, preferably a band belt ply is further disposed on the radially outside of the belt layer 7, which band belt ply comprises one or more cords, for example organic fiber cords, wound spirally around the belt layer 7 across the substantially whole width thereof.

The inner reinforcing layer 8 is composed of one ply of high modulus cords disposed on the axially inner face of the carcass main portion 6A.

The radial height H8d of the radially inner edge of the inner reinforcing layer 8 from the bead base line BL is not more than the height Hf of the flange edge point X1. The radial height H8u of the radially outer edge thereof from the bead base line BL is not less than a height Hs which is 25% of the tire section height Ht.

The inner reinforcing layer 8 extends at least between the radially inner position X1 of the flange edge and a radially outer position X2 at the 25% height of the tire section height Ht.

When the radially outer edge of the inner reinforcing layer 8 is radially inward of the outer position X2, it becomes difficult to reinforce the sidewall lower portion and bead portion. When the radially inner edge of the inner reinforcing layer 8 is radially outward of the inner position X1, it becomes difficult to maintain the bending rigidity of the bead portion, and edge separation failure is liable to occur.

Therefore, it is more preferable that the radially Inner edge of the layer 8 is located radially inside a point EP. This point Is such that, radially inward thereof, the axially outer surface of the bead 4 contacts with the axially inner surface of the rim flange 11, and radially outward thereof they do not contact with each other under the normally inflated but not loaded condition.

The height H8u of the outer edge of the layer 8 is less than the carcass turnup height Hc. Preferably, the height H8u is not more than 0.33 times the tire section height Ht, whereby edge separation failure at the outer edge is prevented.

Further, the cords in the inner reinforcing layer 8 are inclined at an angle of 15 to 50 degrees with respect to the circumferential direction of the tire. Thereby, the circumferential rigidity of the tire is improved. However, if the inclination is less than 15 degrees, it is difficult to make such a layer. If the inclination is more than 50 degrees, the reinforcing effect is less.

The outer reinforcing layer 9 comprises two plies 9A and 9B which are disposed between the carcass main portion 6A and each turned up portion 6B. By the outer layer 9, the elongation of the carcass cords in the bead portion 4 caused when a lateral force is applied can be controlled, and bead rigidity Is increased, and steering stability is improved The heights H9ad and H9bd of the radially inner edges of the plies 9A and 9B, respectively, are not more than the height Hf of the flange edge position X1, and the inner edges are preferably terminated near or at the radially outer face of the bead core 5.

The heights H9au and H9bu of the radially outer edges of the plies 9A and 9B, respectively, are more than the height Hs of the radially outer position X2.

When the radially outer edges are lower than the position X2, it becomes difficult to maintain the rigidity in the sidewall lower portion and bead portion. When the radially inner edges are higher than the position X1, the bending rigidity of the bead portion is decreased.

In this embodiment, the inner edge of the axially outward ply 9B is adjacent to the radially outer surface of the bead core 5, and the inner edge of the axially inward ply 9A is spaced apart from the radially outer surface of the bead core 5 by a distance (l) being not more than ⅔ times the maximum diameter of the bead core.

The region Y, in which there is only the outer reinforcing layer 9 between the carcass main portion 6A and the turned up portion 6B, that is, there is no bead apex rubber therebetween, extends at least between the radially inner position X1 and outer position X2.

The heights H9au and H9bu are preferably less than carcass turnup height Hc, whereby edge separation failure is avoided.

It is not preferable that the radially outer edges of the plies 9A and 9B are terminated at the same height as the radially outer edge of the carcass turned up portion 6B because the rigidity is altered abruptly at such position if done so, and a stress concentrates on the edges, and, further an adhesive failure of the cord ends, is liable to be caused.

For the same reason, preferably the radially outer edges of the plies 9A and 9B are not aligned.

In this embodiment, the height H9au of the axially inward outer reinforcing layer 9A is higher than the height H9bu of the axially outward outer reinforcing layer 9B.

The cords in each of the plies 9A and 9B are inclined at an angle of 30 to 60 degrees, more preferably 40 to 50 degrees, with respect to the circumferential direction of the tire so that the cords in the ply 9A cross those in the other ply 9B, whereby the rigidity of the bead portion is effectively improved. When the angle is less than 30 degrees, the circumferential rigidity of the bead portion and sidewall lower portion is lowered. When the angle is more than 60 degrees, the bending rigidity thereof is not provided.

Further, the cords of the outer reinforcing layer 9 are inclined to cross the cords of the above-mentioned inner reinforcing layer 8.

Furthermore, the cord spacing d1 between the cords in the ply 9A and the cords in the adjacent ply 9B is 1 to 2 times the thickness D of those cords. The cord spacings d2 between the adjacent cords within each of the plies 9A and 9B are 0.25 to 2 times the cord thickness D. Therefore, the shear between the cords caused by the tire deflection can be mitigated, and a rubber separation failure can be prevented to improve durability, and further, the bending rigidity of the sidewall lower portion and bead portion increases.

When the cord spacings d1 and d2 are more than 2 times the thickness D, due to the existence of the resultant thick rubber layer, the internal bead temperature is increased to deteriorate the bead durability, and also a weight reduction in the bead portions 4 is hindered. These limitations for d1 and d2 must be satisfied by at least 60% in number of all the spacings, preferably not less than 80%, more preferably not less than 90% thereof.

Further, the coating rubber used for the cords of the reinforcing layers 8 and 9 used is a rubber composition of which 100% modulus is 40 to 70 kg/sq.cm and elongation and stress at rupture are 200 to 350% and 150 to 300 kg/sq.cm, respectively, and which has a higher strength and higher durability in comparison with a general low-heat-generation rubber. When the 100% modulus is less than 40 kg/sq.cm, or the elongation at rupture is more than 350%, or when the stress at rupture is more than 300 kg/sq.cm, heat generation from the rubber increases to lower the high speed durability of the bead. When the 100% modulus is more than 70 kg/sq.cm, or the elongation at rupture is less than 200%, or the stress at rupture is less than 150 kg/sq.cm, the strength of the rubber is reduced to cause a rubber breakage, and the bead durability is deteriorated.

More preferably, the 100% modulus is 45 to 55 kg/sq.cm, and the elongation at rupture is 280 to 340%, and the stress at rupture is 200 to 250 kg/sq.cm.

For the reinforcing layers 8 and 9, aromatic polyamide fiber cords are suitably used for their high modulus nature similar to steel cords and light weight nature. In the case of a passenger car tire, the structure of such aromatic polyamide fiber cords is 720d/2 to 3000d/2, and the cord count is 25 to 45 ends/5 cm, and the cord twist is 20 to 70 turns/10 cm.

Figure 2:
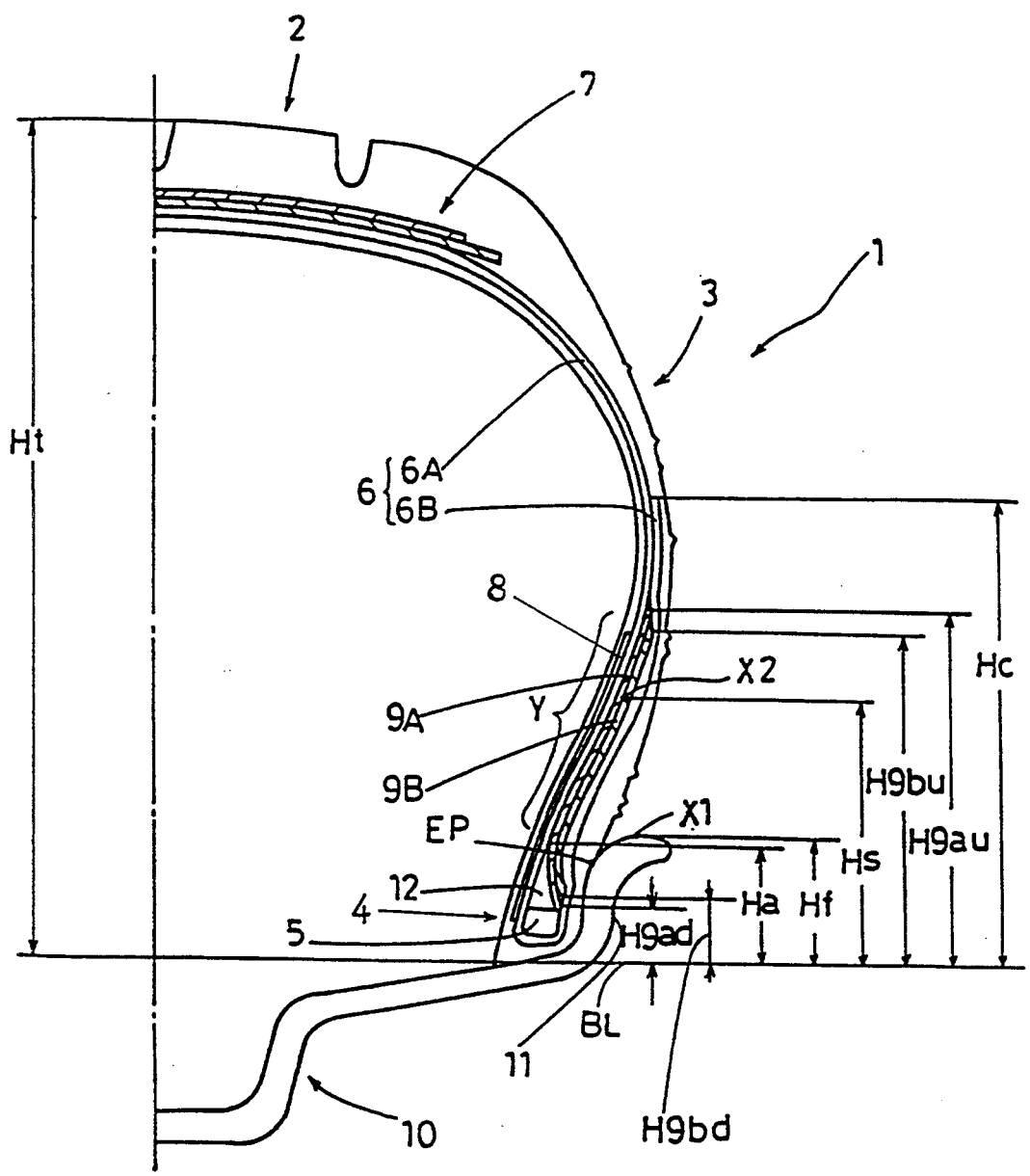
FIG. 2 is a cross sectional view of a right half of another passenger car tire according to the present invention.

FIG. 2 is another embodiment of the present invention, in which a small size bead apex 12 is provided in each bead portion 4. Excepting this the tire structure is very similar to that of the above-explained embodiment.

The bead apex 12 is composed of hard rubber having a JIS A hardness of 60 to 90 disposed between the carcass main portion 6A and each turned up portion 6B. The bead apex 12 has a triangular cross sectional shape tapering radially outwardly from the bead core 5.

The height Ha of the radially outer edge of the bead apex 12 from the bead base line BL is not more than the height Hf of the flange edge position X1 from the bead base line BL, whereby the bead apex 12 is greatly decreased in volume in comparison with the conventional bead apexes of which height is about 2 times the rim flange height Hf, and the tire weight is not increased.

Test tires of size 185/60R14 were prepared and tested for the tire weight, lateral spring constant, lane change stability, yaw convergence, and cornering asphalt G. The specifications or the test tires and test results are given In Table 1.

The lateral spring constant was calculated from a lateral force applied to the test tire mounted on its regular rim and inflated to its regular inner pressure and the amount of the resultant deformation of the tire.

The lane change stability is the stability when a quick lade change was made during straight running at a speed of 100 km/h The yaw convergence is the convergence of the yaw caused by the above-mentioned quick lane change.

The cornering G on asphalt was calculated from the maximum cornering speed marked by the test vehicle during cornering on a dry asphalt road at a radius of 50 meters and the lateral force on the vehicle at the maximum cornering speed.

As seen from Table 1, the working example tires were lighter In tire weight than the reference tire, whereas with respect to the tire performance the working example tires were the same level as or superior to the reference tire.

Incidentally, the carcass 6 may include a further ply, e.g. a ply not turned up around the bead cores 5 or a ply turned up around the bead cores 5 from the axially outside to inside thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

|  | Ex. 1 | Ex. 2 | Ref. |
|---|---|---|---|
| Tire size | 185/60R14 | 185/60R14 | 185/60R14 |
| Carcass Material | polyester | polyester | polyester |
| Reinforcing layer | aromatic | metal cord | — |

TABLE 1-continued

Figure 3:
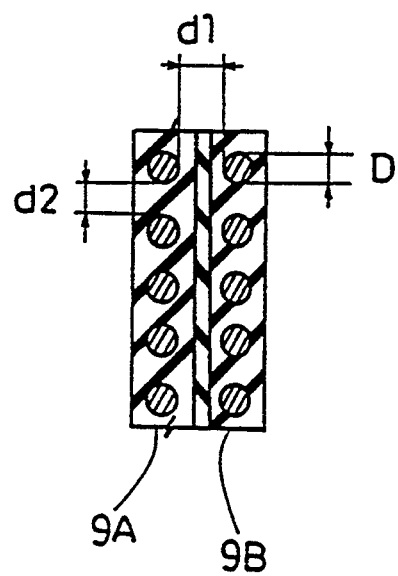
FIG. 3 is a sectional view explaining the cord spacings in the outer reinforcing layer thereof.
Figure 4:
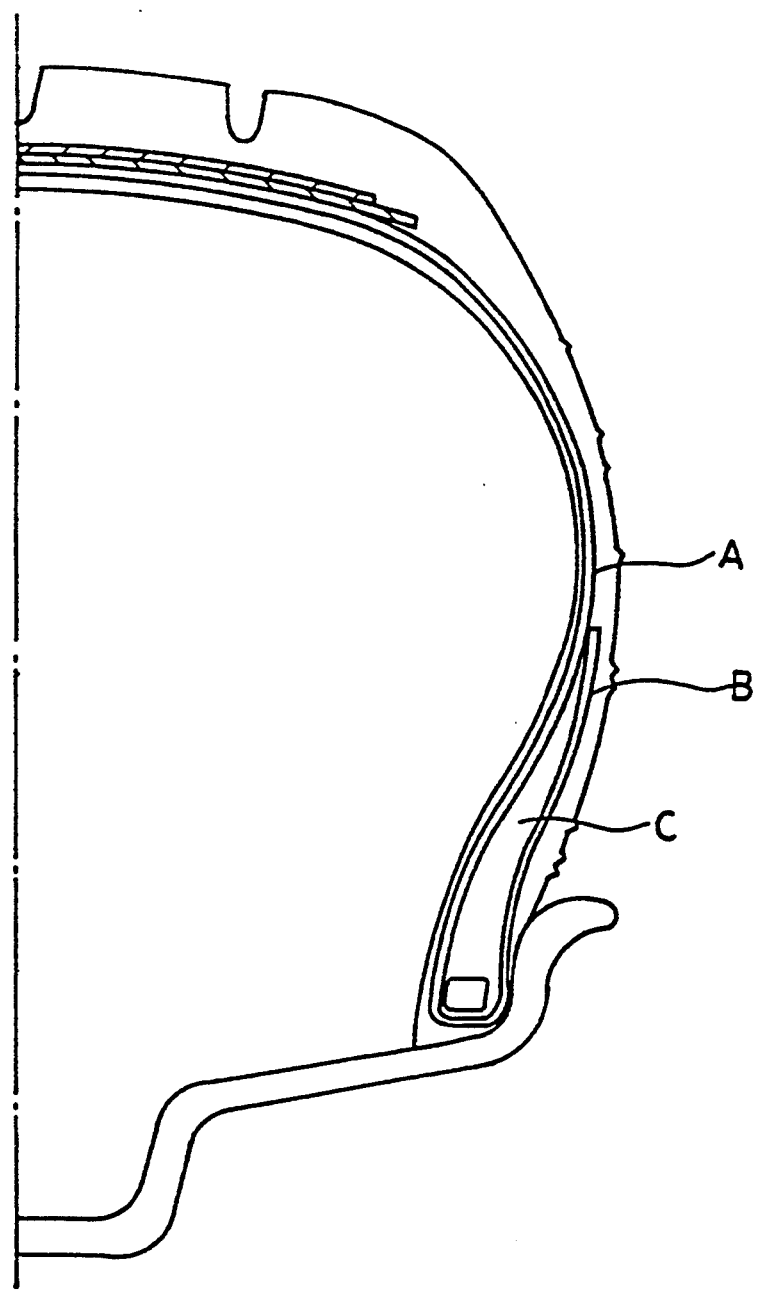
FIG. 4 is a cross sectional view of a right half of a conventional tire.

|  | Ex. 1 | Ex. 2 | Ref. |
|---|---|---|---|
| Material | polyamide |  |  |
| Cord angle (deg.) |  |  |  |
| Inner | 45 | 45 | — |
| Outer *1 | 30 × 30 | 30 × 30 | — |
| Bead structure | FIG. 1 | FIG. 1 | FIG. 3 |
| Ht (mm) | 110 | 110 | 110 |
| Hs (mm) | 27.5 | 27.5 | 27.5 |
| Hca (mm) | 65 | 65 | 65 |
| Hca/Ht (%) | 59 | 59 | 59 |
| H9bu (mm) | 50 | 45 | — |
| H9au (mm) | 55 | 50 | — |
| H9au/Ht (%) | 50 | 45 | — |
| H8u (mm) | 45 | 45 | — |
| H8d (mm) | 12 | 12 | — |
| Ha (mm) | 16 | 16 | 42 |
| Hf (mm) | 18 | 18 | 18 |
| Tire weight (kg) *2 | 96 | 98 | 100 |
| Lateral spring constant (kg/mm) *2 | 99 | 103 | 100 |
| Lane change stabillty *3 | 3.0 | 3.5 | 3.0 |
| Yaw convergence *3 | 3.0 | 3.5 | 3.0 |
| Cornering asphalt G *2 | 98 | 104 | 100 |

*1 Inner layer cord angle × Outer layer cord angle Inclinations are in the opposite directions with respect to the radial direction
*2 indicated by an index based on that Reference tire = 100    Tire weight: the smaller value is better    Lateral spring constant and cornering asphalt G: the larger value is better
*3 the larger the point, the better the performance

I claim:

1. A tire and rim combination comprising
a wheel rim including a flange having a radially outermost edge, and
a pneumatic tire, said tire including
a pair of bead portions, each of the bead portions having a bead core disposed therein,
a toroidal carcass comprising at least one ply of carcass cords arranged radially at an angle of 75 to 90 degrees with respect to the tire equator, the carcass extending between the pair of bead portions and turned up around each of the bead cores from axially inward to outward thereof to form two turned up portions and a main portion therebetween,
an axially inner reinforcing layer disposed axially inside the main portion in each of the bead portions, said inner reinforcing layer having a radially inner edge located radially inward of radially outermost edge of the flange, and
an axially outer reinforcing layer disposed between the main portion and each said turned up portion, said outer reinforcing layer having a radially inner edge located radially inward of the radially outermost edge of the flange,
each of said turned up portions extending radially outwardly along and adjacently to the main portion from one of the bead portions to a position not lower than a ¼ height of the tire section height, each of said turned up portions extends radially outwardly over the radially outer edge of said adjacent outer reinforcing layer,
each of said inner reinforcing layers comprising one ply of high modulus cords laid at 15 to 50 degrees with respect to the circumferential direction of the tire and extending along an inner face of the main portion at least from a ¼ height of the tire section height to one of the bead portions,
said outer reinforcing layer comprising two cross plies of high modulus reinforcing cords laid at 30 to 60 degrees with respect to the tire circumferential direction, each of said outer reinforcing layers extending at least from said ¼ height of the tire section height to one of the bead portions, the cord spacing between the adjacent plies in said outer reinforcing layer being 1 to 2 times the reinforcing cord thickness, wherein between the main portion and each turned up portion, at least from an inner radial position (X1) to an outer radial position (X2), there is only said outer reinforcing layer, the inner radial position (X1) corresponding to the radially outermost edge of the flange, and the outer radial position (X2) corresponding to said ¼ height of the tire section height.

2. The combination according to claim 1, wherein the carcass cords are inclined so that the cords in the main portion cross the cords in said turned up portions.

3. The combination according to claim 1, wherein the cords in said inner reinforcing layer cross those in said outer reinforcing layer.

* * * * *